United States Patent [19]
Yackiw et al.

[11] 3,788,008
[45] Jan. 29, 1974

[54] BELT LINE WEATHER SEAL

[75] Inventors: Charles Yackiw, Fairport; Fred Williams, Pittsford, both of N.Y.

[73] Assignee: The Schlegel Manufacturing Company, Rochester, N.Y.

[22] Filed: Oct. 4, 1972

[21] Appl. No.: 294,944

[52] U.S. Cl. .................................................. 49/496
[51] Int. Cl. ............................................. E06b 7/22
[58] Field of Search ................... 49/490–496, 485, 49/475; 161/64, 67, 126, 125, 102, 103

[56] References Cited
UNITED STATES PATENTS

| | | | |
|---|---|---|---|
| 3,354,584 | 11/1967 | Parsons | 49/485 X |
| 2,267,433 | 12/1941 | Tea | 49/492 |
| 3,276,167 | 10/1966 | Bus et al. | 49/485 |
| 3,359,688 | 12/1967 | Konolf | 49/490 |
| 3,371,447 | 3/1968 | Ruff et al. | 49/490 |
| 3,198,689 | 8/1965 | Lansing | 49/490 X |
| 2,457,312 | 12/1948 | Kramer | 49/491 |
| 3,167,856 | 2/1965 | Zoller | 49/495 X |

*Primary Examiner*—Mervin Stein
*Assistant Examiner*—Philip C. Kannan
*Attorney, Agent, or Firm*—Cumpston, Shaw & Stephens

[57] ABSTRACT

A belt line weather seal uses a spring metal core having spaced apart fingers that extend around the curve of the seal and into its resilient arm, and a plastic material covers the metal core and extends from the top of the seal to the tip of the resilient arm. The plastic is preferably relatively rigid in the portion of the seal that is fixed in place and is relatively flexible in the curve and the resilient arm. A pile material covers the glass-engaging outer region of the resilient arm.

7 Claims, 8 Drawing Figures

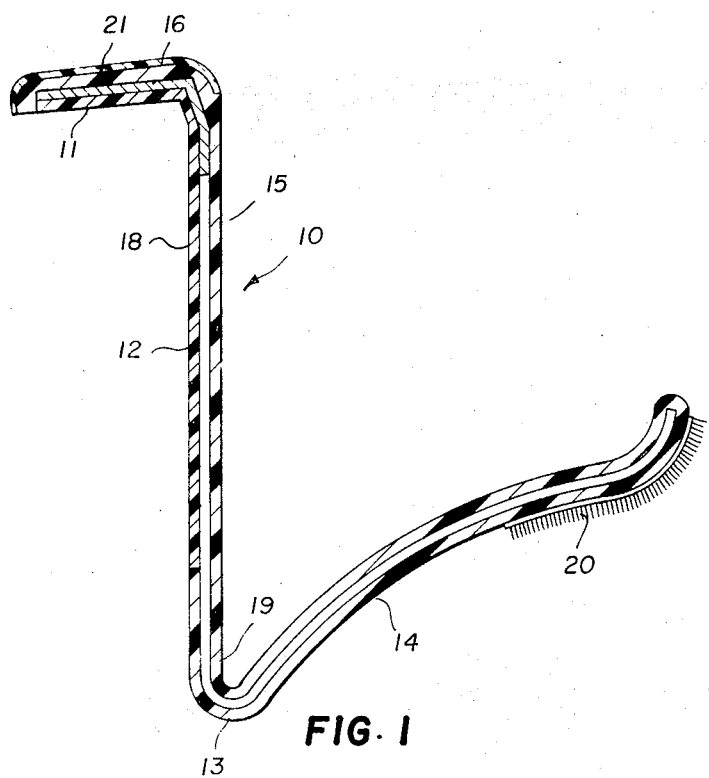
FIG. 1
FIG. 3
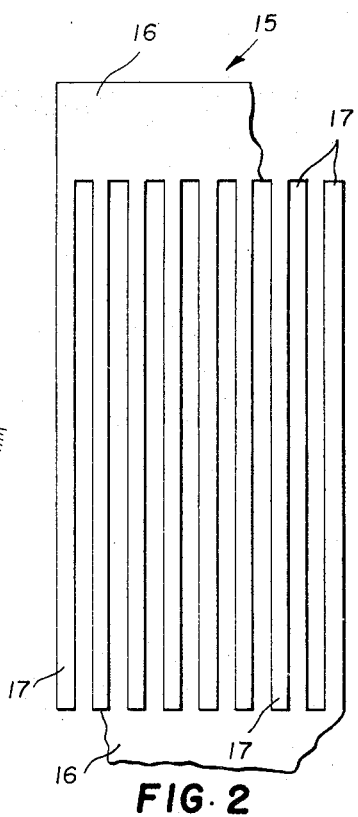
FIG. 2
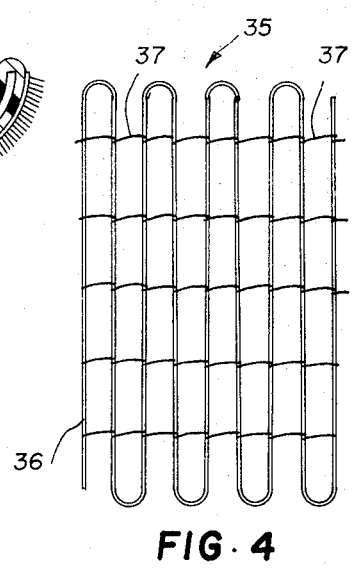
FIG. 4

3,788,008

BELT LINE WEATHER SEAL

THE INVENTIVE IMPROVEMENT

Belt line weather seals have caused many problems, and automotive specifications for these seals are complex and demanding. The most recently used seals have been formed of rubber with a ledge or anchoring portion fixed in place, a downwardly extending leg braced against a fixed surface, a curvature at the bottom of the leg, and a resilient arm extending away from the curvature to engage the window glass. In cold winter weather these seals acquire a cold set so they are not able to follow movement of the window glass, and they also set and permanently harden in especially high temperatures. Manufacturing tolerances require considerable resilience of the free arm of the weather seal to engage the glass securely at all its possible locations, and this is further complicated by the discovery that the window glass tends to shift its position after repeated closings of the door. Another important factor is the cost and characeristics of possible materials, so that design of a satisfactory belt line weather seal meeting all the present requirements is a considerable challenge.

The invention solves these problems and meets the requirements for a belt line weather seal that is sufficiently resilient at any temperature to maintain a secure engagement with the window glass even considering manufacturing tolerances and possible change of position of the window glass during use. The invention also accomplishes this economically with a weather seal that is simple, reliable, inexpensive, and better than previous weather seals.

SUMMARY OF THE INVENTION

The inventive belt line weather seal has a top portion, a downwardly extending leg, an acute angle curve at the bottom of the leg, and a resilient arm extending away from the curve to engage a window glass at the belt line of a motor vehicle. The improvement in such a weather seal is a spring metal core having spaced part fingers that extend around the curve and into the resilient arm, and a plastic material coating the metal core and extending from the top portion through the downward leg and out to the tip of the resilient arm. The top portion and the downward leg are relatively rigid, and the curve and the resilient arm are relatively flexible, and a pile material covers a glass-engaging outer region of the resilient arm.

DRAWINGS

FIG. 1 is a cross sectional view of a preferred embodiment of the inventive weather seal;

FIG. 2 is a fragmentary, plan view of a spring metal core for the weather seal of FIG. 1;

FIG. 3 is a cross sectional view of another preferred embodiment of the inventive weather seal;

FIG. 4 is a fragmentary plan view of a spring metal core formed of zig zag loops of wire and usable in the inventive weather seal;

DETAILED DESCRIPTION

Figure 5:
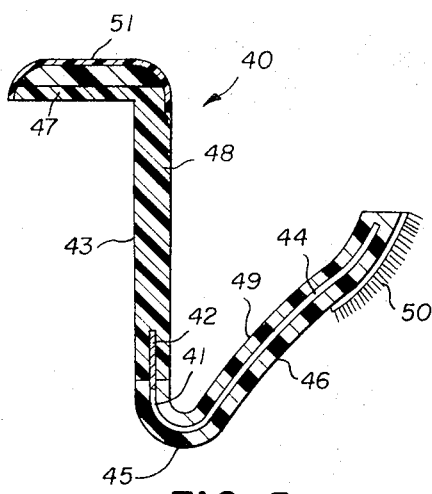
FIG. 5 is a cross sectional view of another preferred embodiment of the inventive weather seal.

Belt line weather seal 10 as shown in cross section in FIG. 1 is made in indefinite lengths that are longitudinally flexible to fit either straight or curving belt lines of motor vehicles. Seal 10 has a top portion or ledge 11, a downward leg 12, a curve 13 at the bottom of leg 12, and a resilient arm 14 extending away from curve 13 to engage a window glass. Seal 10 contains a spring metal core 15 also shown in FIG. 2 as having a solid strip 16 arranged in top ledge 11 and the upper part of downward leg 12, and having spaced apart fingers 17 extending downward in leg 12, around curve 13 and out into resilient arm 14. Preferably a pair of spring metal cores 15 are die cut from a somewhat wider piece of metal as shown, so that fingers 17 are alternated between opposing strips without any wasted metal. Core 15 is preferably formed of spring steel, spring aluminum, or spring bronze.

A plastic material covers spring metal core 15 and extends from top ledge 11 through downward leg 12, around curve 13, and out to the tip of arm 14. The plastic cover has a relatively rigid portion 18 extending from the under side of top ledge 11 substantially down the back of leg 12, and a relatively flexible portion 19 extending over the top of ledge 11, down the front of leg 12, around curve 13, and ot into resilient arm 14. Rigid plastic 18 helps fix seal 10 securely in place, and flexible plastic 19 helps curve 13 and arm 14 achieve the desired resilience and flex life. out A pile material 20 is secured to the outer region of arm 14 in position for engaging a window glass. Pile 20 can be flocked directly onto arm 14, or can be a woven pile material secured to arm 14. A decorative and preferably plastic strip 21 laid over the top of portion 11 completes weather seal 10, but strip 21 can be omitted or another material can be used.

Seal 10 can flex repeatedly with the desired resilience, force, and flex life and can move pile material 20 through a wide range of positions to engage a window glass throughout its travel. Seal 10 also has a better wear life and will not take a hot or cold set that impairs its subsequent flexibility.

Weather seal 25 of FIG. 3 is similar to seal 10 with top ledge 26 shaped differently and spring metal core 27 folded back on itself in top ledge 26 as illustrated. Otherwise, the spaced fingers of core 27 extend around curve 28 and into resilient arm 29, and curve 28 is "U" shaped to improve the flex life of seal 25. Hard, rigid plastic 30 extends throughout top ledge 26 and both sides of downward leg 31, and soft, flexible plastic 32 covers curve 28 and flexible arm 29. Pile 33 is on arm 29, and a decorative strip 34 lays over portion 26.

FIG. 4 shows a different type of spring metal core 35 usable in the inventive weather seal. Core 35 is formed of spring wire 36 laid in zig zag loops as illustrated with stitching 37 securing the loops together. Stitching 37 maintains the longitudinal relationship between loops of wire, and spring wire 36 is transversely resilient and flexible to serve as a spring metal core in the inventive seal. Core 35 can be used in many of the preferred embodiments shown in the drawings as having other spring metal cores.

Figure 6:
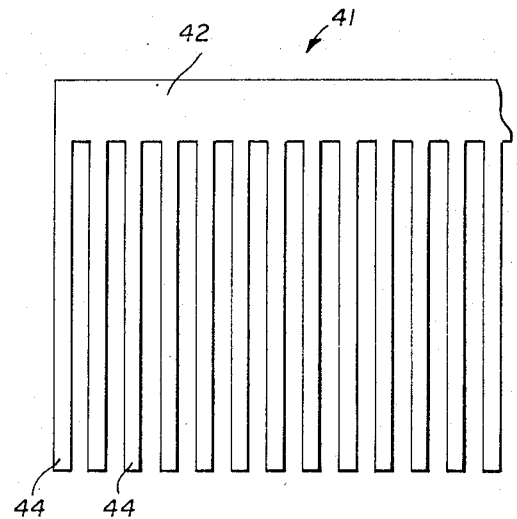
FIG. 6 is a fragmentary plan view of a spring metal core for the weather seal of FIG. 5.

Seal 40 of FIG. 5 has a spring metal core 41 as shown in FIG. 6 with a solid strip 42 arranged in downward leg 43 and spaced apart fingers 44 extending around curve 45 and into resilient arm 46. This requires a little less material for spring metal core 41 which does not extend into the upper portion of down leg 43 or into top ledge 47. These regions are formed by rigid plastic material 48, and core 41 is covered with flexible plastic material 49 for the desired resilience in arm 46. Pile material 50 is secured to arm 46, and a decorative strip 51 is laid over top ledge 47.

Figure 7:
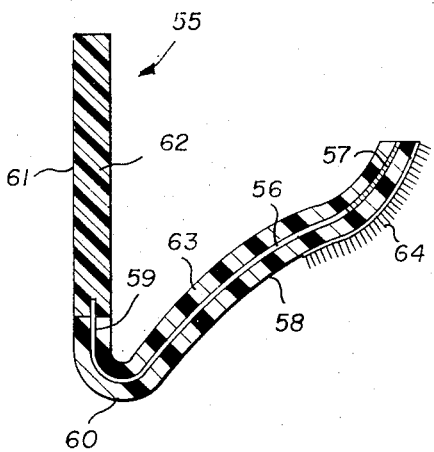
FIG. 7 is a cross sectional view of another preferred embodiment of the inventive weather seal.
Figure 8:
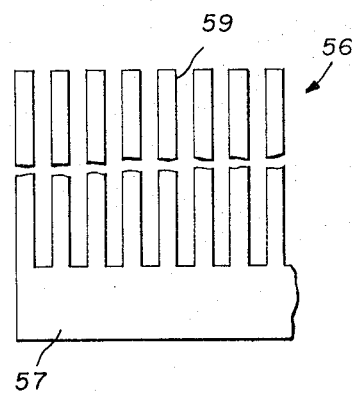
FIG. 8 is a fragmentary plan view of the spring metal core used in the embodiment of FIG. 7.

Seal 55 of FIG. 7 is similar to seal 40 except that it has no ledge on its top portion and spring metal core 56 has a solid strip 57 arranged near the tip of flexible arm 58, with spaced apart fingers 59 extending down arm 58 and around curvature 60 and into the lower portion of downward leg 61. The upper portion of leg 61 is formed of rigid plastic material 62, and a relatively flexible plastic material 63 covers core 56 around curve 60 and out into arm 58. Pile 64 is arranged on arm 58.

The inventive weather seal thus meets all the present requirements for belt line seals including range of flexibility, flex life, manufacturing tolerance, and capacity to operate even at high or low temperatures without taking a set. It also meets these requirements in a simple and economical weather seal that can be made efficiently in quantity and economically installed in motor vehicles.

Persons wishing to practice the invention should remember that other embodiments and variations can be adaped to particular circumstances. Even though one point of view is necessarily chosen in describing and defining the invention, this should not inhibit broader or related embodiments going beyond the semantic orientation of this application but falling within the spirit of the invention. For example, those skilled in the art will understand the various materials and configurations usable within the scope of the invention.

I claim:

1. In a belt line weather seal having a top portion, a downwardly extending leg, an acute angle curve at the bottom of said leg, and a resilient arm extending away from said curve to engage a window glass at the belt line of a motor vehicle, the improvement comprising:

a. a spring metal core;
   b. said core having longitudinally spaced apart fingers;
   c. means for holding said fingers in said spaced-apart relation;
   d. said fingers extending around said curve and into said resilient arm;
   e. a plastic material covering said core and said finger holding means extending from said top portion, through said downward leg and out to the tip of said resilient arm;
   f. Said core and said plastic material cooperating to make said top portion and said downward leg relatively rigid and said curve and said resilient arm relatively flexible; and
   g. pile material covering a glass-engaging outer region of said resilient arm.

2. The weather seal of claim 1 wherein said finger holding means is a solid strip of said metal core running lengthwise of said weather seal along one edge of said core, and said fingers are normal to and extend away from said strip to terminate in free ends spaced from said strip.

3. The weather seal of claim 2 wherein said solid strip is arranged in said downward leg.

4. The weather seal of claim 2 wherein said solid strip is arranged in said top portion.

5. The weather seal of claim 2 wherein said solid strip is arranged in the region of said tip of said resilient arm.

6. The weather seal of claim 1 wherein said spring metal core and said fingers are formed of a spring wire looped in a zig zag pattern, and said finger holding means is stitching securing successive loops of said wire together.

7. The weather seal of claim 1 including a decorative strip secured over said plastic material in said top portion.

* * * * *